United States Patent

[11] 3,624,256

[72] Inventor Frank Dennis Marsh
 Wilmington, Del.
[21] Appl. No. 16,951
[22] Filed Mar. 5, 1970
[45] Patented Nov. 30, 1971
[73] Assignee E. I. du Pont de Nemours and Company
 Wilmington, Del.
 Continuation-in-part of application Ser. No.
 663,212, Aug. 25, 1967, now abandoned.
 This application Mar. 5, 1970, Ser. No.
 16,951

[54] 1,1,1-TRISUBSTITUTED-2-CYANOHYDRAZINIUM HYDROXIDE, INNER SALTS AND THE PREPARATION THEREOF
 7 Claims, No Drawings
[52] U.S. Cl. .................................................. 260/296,
 260/239, 260/293, 260/326.62, 260/551, 260/553,
 260/294, 260/326.3, 260/29.6, 260/295, 252/355,
 252/363.5, 106/307, 106/308, 106/288

[51] Int. Cl. .................................................. C07d 31/46
[50] Field of Search .......................................... 260/294.9,
 551, 326.62, 293, 239, 296

[56] References Cited
 UNITED STATES PATENTS
 3,427,323 /1969 Marsh .......................... 260/551

*Primary Examiner*—Henry R. Jiles
*Assistant Examiner*—Harry I. Moatz
*Attorney*—D. R. J. Boyd ABSTRACT: 1,1,1-Trisubstituted-2-cyanohydrazinium hydroxide, inner salts, obtained by reaction of tertiary amines and cyanogen azide, useful as dispersing agents for suspending solids in aqueous media and as intermediates for producing buffering agents are claimed.

1,1,1-TRISUBSTITUTED-2-CYANOHYDRAZINIUM HYDROXIDE, INNER SALTS AND THE PREPARATION THEREOF

RELATED APPLICATIONS

This application is a continuation-in-part of application Ser. No. 663,212 filed Aug. 25, 1967, now abandoned.

BACKGROUND OF THE INVENTION

This invention relates to inner salts of 1,1,1-trisubstituted-2-cyanohydrazinium hydroxide and to the preparation thereof from cyanogen azide and a tertiary amine.

WARNING: Cyanogen azide, a reactant in this invention, is explosive when free or nearly free of solvent and should be handled with great care. It can be used, however, with comparative safety in dilute or moderately concentrated solution.

SUMMARY OF THE INVENTION

This invention is directed to a zwitterionic compound of the formula

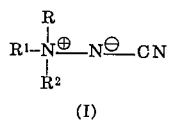

(I)

wherein R is alkyl of up to 10 carbon atoms or cycloalkyl of four to six carbon atoms, $R^1$ and $R^2$, taken separately, are alkyl of up to 10 carbon atoms, cycloalkyl of four to six carbon atoms, phenyl or naphthyl; $R^1$ and $R^2$ taken together, is a divalent alkylene group of four to six carbon atoms; and R, $R^1$ and $R^2$ taken together, is —CH=CH—CH=CH—CH=. These zwitterionic compounds are prepared by heating at a temperature of 0°–100° C. cyanogen azide, $N_3$—CN, and a tertiary amine of the formula

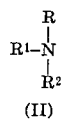

(II)

wherein R, $R^1$ and $R^2$ are as described above. These zwitterionic compounds are useful as dispersing agents for suspending solids in aqueous media and as a intermediates for producing buffering agents.

DESCRIPTION OF THE PREFERRED EMBODIMENTS

A. Composition of matter

The zwitterionic compounds of this invention represented by formula I are called N,N,N-trisubstituted aminocyanoimides or 1,1,1-trisubstituted-2-cyanohydrazinium hydroxide, inner salts (see Rules 276–280 of the Naming and Indexing of Organic Compounds, Chemical Abstracts, Vol. 56, pg. 45N). These compounds are generally colorless, solid or high-boiling-liquid products. The zwitterionic structure

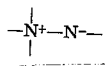

is stable in acidic aqueous reagents which are capable of converting the cyano group into an amide group. Hydrolysis of the compounds of this invention yield 1,1,1-trisubstituted ureido ammonium salts, especially the chlorides, having the formula

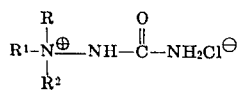

These carbonyl derivatives react with ammonia to form ammonium salts which are buffering agents.

In the compounds of this invention, R is alkyl of up to 10 carbons and cycloalkyl of four to six carbons, and $R^1$ and $R^2$, taken separately are alkyl of up to 10 carbons, phenyl, naphthyl or cycloalkyl of four to six carbons. For example, within the definition of R, $R^1$ or $R^2$ is included: methyl, ethyl, n-propyl, isopropyl, n-butyl, isobutyl, n-pentyl, isopentyl, hexyl, heptyl, octyl, nonyl, decyl, cyclobutyl, cyclopentyl, cyclohexyl, and the like. Additionally, $R^1$ and $R^2$, taken together, can be 1,4-butylene, 1,5-pentylene, and 1,6-hexylene and R, $R^1$ and $R^2$ taken together is —CH=CH—CH=CH—CH=. The compounds wherein $R^1$ is alkyl and $R^1$ and $R^2$ are phenyl or alkyl are preferred. The compounds wherein R, $R^1$ and $R^2$ are alkyl are most preferred.

B. Process

The 1,1,1-trisubstituted-2-cyanohydrazinium hydroxide, inner salts, of this invention are obtained by heating a tertiary amine with cyanogen azide at temperatures of 0°–100° C. preferably in an inert solvent. Gaseous nitrogen is liberated in the course of the mildly exothermic reaction.

The reactants are normally brought together at room temperature and allowed to react spontaneously, preferably at a temperature of 25°–50° C. Inert solvents, such as aliphatic nitriles, e.g., acetonitrile, aromatic nitriles, e.g., benzonitrile, aliphatically saturated hydrocarbons or halohydrocarbons, e.g., hexane, cyclohexane, benzene, toluene, methylene chloride, ethyl bromide, chlorobenzene and the like or esters, e.g., ethyl acetate, methyl benzoate and the like, can be used as a diluent and as a safety precaution for the handling of cyanogen azide. However, the reaction can be conducted without added solvent.

The process can be conducted in a batch or continuous-flow process. The process is conveniently conducted at atmospheric pressure but can also be conducted at subatmospheric or superatmospheric conditions. The reaction time required for the process can be 1–4 hours or shorter or up to 10–20 hours or longer.

Cyanogen azide is produced by the reaction of a cyanogen halide with an alkali-metal halide in an organic solvent such as acetonitrile or methylene chloride. Cyanogen azide is described in my copending coassigned application Ser. No. 215,800, filed Aug. 9, 1962 and in J. Am. Chem. Soc., 86, 4506 (1964).

The tertiary-amine reactants are well known, readily available compounds (See Wagner and Zook, Synthetic Organic Chemistry, John Wiley and Sons, Inc., New York, 1953, pp. 653–727). Tertiary-amine reactants which can be used in the process of this include methyldiethylamine, ethyldimethylamine, tripropylamine, tributylamine, methyldibutylamine, dipentylethylamine, dihexylmethylamine, octyldimethylamine, di-n-octylmethylamine, tri-n-octylamine, di-n-decylmethylamine, di-n-decylbutylamine, N-methyl pyrrolidine, N-decylpyrrolidine, N-methylpentamethylenimine, N-decylhexamethylinimine, cyclohexyldimethylamine, cyclopentyldimethylamine, cyclobutyldimethylamine, cyclohexyldecylmethylamine, cyclobutyldimethylamine, cyclohexyldecylmethylamine, cyclohexylphenylmethylamine, cyclohexyl-α-naphthylmethylamine, N-ethylhexamethylinime, N-methylhexamethylenimine, N-methylpentamethylenimine, N-octylpyrrolidine N-propylpyrrolidine, N-ethylpentamethylenimine, phenyldimethylamine, diphenylmethylamine, diphenyldecylamine, naphthyldimethylamine, dinaphthylmethylamine, dinaphthylbutylamine, naphthyldidecylamine, pyridine and the like.

The following examples further illustrate the invention.

EXAMPLE 1

1,1,1-Triethyl-2-Cyanohydrazinium Hydroxide, Inner Salt

$(C_2H_5)_3N + N_3CN \rightarrow (C_2H_5)_3N{-}N{-}CN + N_2$

A. Cyanogen azide (0.22 mole) dissolved in acetonitrile (total solution volume 84 ml.) was added with stirring during 50 minutes to a large excess of triethylamine (1000 ml., ~723 g., 7.2 moles). The temperature rose spontaneously from 24°–36.5° C., nitrogen (~0.18 mole) was liberated, and an oil separated. The mixture was stirred and heated at 40°–62° C. for an additional 6 hours. The oil was separated, taken up in acetonitrile (total solution volume 290 ml.) and filtered. A 50 ml. aliquot of this filtrate was evaporated to dryness (50° C./0.2 mm.) to give a brown oil (4.9 g., 92 percent). An aliquot of the residual oil was dissolved in methylene chloride, passed through a 2½-inch bed of magnesia-silica gel, and the eluant evaporated to dryness (25° C./0.1 mm.) to give the product as a crystalline solid which was sequentially recrystallized once from a mixture of tetrahydrofuran and ether and twice from tetrahydrofuran to give white needles, m.p. 87.7°–89.4° C.

Anal. Calcd. for $C_7H_{15}N_3$:

|  | C. | H. | N. | M.W. |
|---|---|---|---|---|
|  | C. 59.49; | H. 10.70; | N. 29.74; | M.W., 141.3 |
| Found: | C. 60.45, | H. 10.18, | N. 29.99; | M.W., 144 |
|  | C. 60.19; | H. 10.77, | N. 30.14, | M.W., 145. |

H n.m.r. spectrum: (deuterioacetonitrile solution, tetramethylsilane internal standard)

| τ | Assignment | Intensity |
|---|---|---|
| 8.75 (triplet J=7.5 cp.s.) | —CH₃ | 3 |
| 6.74 (quadruplet J=7.5 cp.s.) | —CH₂— | 2 |

| Infrared spectrum | $\lambda^{Anr}_{max}$ 3.34μ, 3.44μ 4.77μ (C≡N); 7.22μ | (saturated C—H); (CH₃—) |
|---|---|---|

B. To a flask equipped with a magnetic stirrer, thermometer, dropping funnel, and condenser (the exit of which was connected to a wet-test meter) was added cyanogen azide (0.22 mole) dissolved in toluene (total volume 151 ml.). The solution was stirred and cooled (23° C.) while triethylamine (22.3 g., 0.24 mole) dissolved in toluene (100 ml.) was added during 30 minutes. Nitrogen (~0.2 mole) was liberated during 17 hours at 23°–25° C., and the light tan crystals separated. The mixture was filtered and the filter cake washed with ether and dried (28.2 g., 91 percent). The filtrate was evaporated to dryness to give additional product (4.65 g., 10 percent). The main fraction (28.2 g.) was dissolved in methylene chloride, decolorized with carbon black and passed through a 3-inch bed of magnesia-silica gel. The eluant was concentrated, cooled, and diluted with ether to give white needles. These crystals were dissolved in acetonitrile and passed through activated alumina (Woelm Neutral Activity 1). The acetonitrile was removed from the eluant (1 mm./25° C.) to give white needles which were recrystallized from tetrahydrofuran to give 1,1,1-triethyl-2-cyanohydrazinium hydroxide, inner salt, m.p. 89.8°–90.8° C.

Anal. Calcd. for $C_7H_{15}N_3$:

|  | C. | H. | N. | M.W. |
|---|---|---|---|---|
|  | C. 59.54; | H. 10.71, | N. 29.76, | M.W., 141.2 |
| Found: | C. 60.69, | H. 10.75, | N. 30.02, | M.W., 142 (Ebullioscopically in chloroform) |

The infrared and H n.m.r. spectra of this compound were identical with the product described in part A, above.

EXAMPLE 2

1,1,1-Trimethyl-2-Cyanohydrazinium Hydroxide, Inner Salt

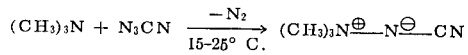

$(CH_3)_3N + N_3CN \xrightarrow[15-25°\ C.]{-N_2} (CH_3)_3N^{\oplus}{-}N^{\ominus}{-}CN$ Toluene (200 ml.) was added to a flask equipped with a thermometer, magnetic stirrer, dropping funnel, gas inlet tube, and condenser (cooled at −78° C.) the exit of which was attached to a wet-test meter. Trimethylamine (27 g., 0.46 mole) was condensed into the flask. The flask was cooled at 15°–24 C. while cyanogen azide (0.32 mole) in acetonitrile (total solution volume 205 ml.) was added during 2 hours. When addition was complete, the mixture was stirred at room temperature for a total of 17 hours, during which time nitrogen (~0.3 mole) was liberated. The reaction mixture was filtered and the off-white crystalline solid dried (29 g.). The filtrate was evaporated to dryness to give additional product (total 32.5 g., 100 percent). The combined product was dissolved in methylene chloride, decolorized with carbon black and filtered through a 3-inch bed of magnesia-silica gel. The eluant was cooled, diluted with ether and filtered to separate fine white needles of 1,1,1-trimethyl-2-cyanohydrazinium hydroxide, inner salt (m.p. 173.5°–176° C., 27.65 g., 86.5 percent).

A sample of crude product prepared in a similar manner by adding trimethylamine diluted with carbon tetrachloride to cyanogen azide prepared in acetonitrile was purified in the same way to give the product (m.p. 171°–172° C.).

Anal. Calcd. for $C_4H_9N_3$:

|  | C. | H. | N. | M.W. |
|---|---|---|---|---|
|  | C. 48.46; | H. 9.15, | N. 42.39; | M.W., 99.1 |
| Found: | C. 48.72; | H. 8.90; | N. 42.02; | M.W., 100, 104 (b.p. in acetone). |

H n.m.r. spectrum: (deuterioacetonitrile solution, tetramethylsilane internal standard).

| τ | Assignment | Intensity |
|---|---|---|
| 6.83 (single peak) | CH₃— | — |

| Infrared spectrum: | $\lambda^{Anr}_{max}$ 3.29μ, 3.37μ 4.76μ (CN). | (saturated C—H); |
|---|---|---|

EXAMPLE 3

1-Cyclohexyl-1,1-Diethyl-2-Cyanohydrazinium Hydroxide, Inner Salt

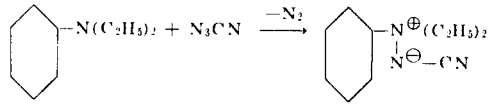

Cyanogen azide (0.18 mole) dissolved in toluene (total solution volume, 72 ml.) was added to N,N-diethylcyclohexylamine (24.9 g., 0.15 mole) during 15 minutes with stirring and cooling to keep the temperature at 25°–35° C. When addition was complete the mixture was stirred at room temperature for an additional 16 hours. Nitrogen, about 0.15 moles, was liberated. The reaction mixture was evaporated to dryness (30° C./1 mm.) to give a brown viscous oil (31.5 g., 100 percent).

This oil was dissolved in toluene, warmed with carbon black, filtered and the filtrate evaporated to dryness to give the product as a light straw-colored viscous oil.

| Infrared spectrum | 2.9μ (possibly NH impurity); 3.4μ, 3.5μ (CH); 3.8μ, 4.0μ, 4.5–4.7μ (CN). |
|---|---|

H n.m.r spectrum (CDCl₃ solution, tetramethylsilane internal standard).

| τ | Assignment | Intensity |
|---|---|---|

| | | |
|---|---|---|
| 3.29 (complex group) | N—CH$_2$ | 4 |
| 5.17 (single peak) | C—N(tentative) H | 1 |
| 5.2–7.5 (broad complex) 7.15 (triplet) | Cyclic CH$_2$— —CH$_3$ | 17 |

EXAMPLE 4

1,1,1-Tri-n-Octyl-2-cyanohydrazinium Hydroxide, Inner Salt

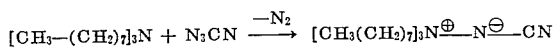

Cyanogen azide dissolved in toluene (0.15 mole, total solution volume, 60 ml.) was added during 20 minutes to tri-n-octylamine dissolved in toluene (50 ml.). The reaction mixture was stirred and cooled to keep the temperature at 24°–38° C. After the initial exothermic reaction subsided, the mixture was stirred at ambient temperature for a total of 18 hours during which time nitrogen (~0.1 mole) was liberated. The reaction mixture was filtered and volatile materials were removed from the filtrate (50° C./1 mm.) to give a viscous brown oil (45 g.). The product was dissolved in toluene (150 ml.), warmed with carbon black and filtered. The filtrate was evaporated to dryness (60° C./1 mm.) to give a viscous tan oil (38 g., 100 percent).

| H n.m.r. spectrum: | (CCl$_4$ solution, tetramethylsilane internal standard). | |
|---|---|---|
| τ | Assignment | Intensity |
| 3.90 | —CH$_2$—N$^+$ | 2 |
| 7.32 | —CH$_2$— | 12 |
| 8.18 | —CH$_3$ | 3 |
| Infrared spectrum: | $\lambda_{max}^{neat}$ 3.4μ, 3.48μ (CH); 4.5μ (CN). | |

EXAMPLE 5

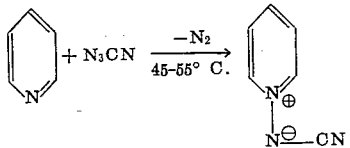

Cyanogen azide (0.118 mole) in acetonitrile (total solution volume 67 ml.) was diluted with pyridine (233 ml.) and the mixture stirred and heated at 49°–55° C. for 5.5 hours. Nitrogen was liberated, and the reaction mixture became dark colored. Volatile materials were removed from the reaction mixture on a rotary evaporator (50° C./1 mm.) to give a brown crystalline solid (13.1 g., 93.5 percent). An aliquot (4 g.) of this crude material was sublimed (140°–180° C./0.1 mm.) and resublimed (140° C./0.1μ) to give pure white crystals of pyridine cyanoimide, m.p. 119°–120° C.

Anal. Calcd. for C$_6$N$_3$H$_3$:
| | | | | |
|---|---|---|---|---|
| | C, 60.49; | H, 4.23; | N, 35.28; | M.W., 119.1 |
| Found: | C, 60.85; | H, 4.26; | N, 35.47; | M.W., 124, 124 (freezing point depression in dimethyl sulfoxide) |

A second aliquot of the crude product was dissolved in methylene chloride, decolorized with carbon black, passed through a short bed of magnesia-silica gel, and the eluant diluted with ether. White crystals separated (m.p. 120.6° to 122.6° C.).

| Infrared spectrum: | 3.22μ (=CH); 4.69μ (C≡N); 6.19μ, 6.76μ (conjugated cyclic C=C and/or C=N). |
|---|---|

| H n.m.r. spectrum: | (dimethyl sulfoxide solution, tetramethylsilane internal standard). | |
|---|---|---|
| τ | Assignment | Weight |
| 2.00–2.25 (complex group) | a | 3 |
| 1.74–1.77 (complex group) | b | 2 |

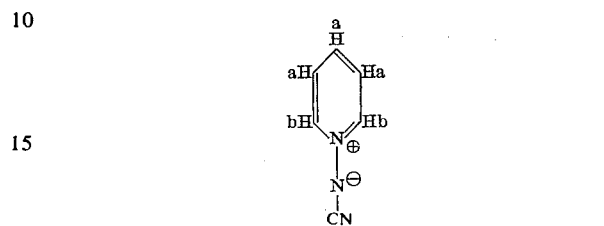

The compounds of this invention and their hydrolysis products are useful as dispersing agents for suspending solids in an aqueous medium. The double pseudoureido tertiary-ammonium ammonium salts are buffering agents for both aqueous and organic media.

For example, a suspension of carbon particles was obtained when 0.5 g. of carbon black was added to 10 ml. of water containing 0.1 g. of the product of example 1 and the mixture was vigorously agitated. The same result was obtained when the experiment was repeated using 0.1 g. of the product of example 2 instead of the product of example 1. The carbon particles of a control experiment consisting of the carbon black and water settled rapidly.

The compounds of the present invention are useful for dispersing pigments in water-based paints such as latex paints. Thus, to 84 ml. water placed in a high-speed mixer was added 6 g. of (CH$_3$)$_3$N$^+$N$^-$CN and 10 g. lampblack was then added slowly and the mixture was stirred for 2 minutes after addition was complete. A thick homogeneous suspension resulted. No water separated from this suspension after standing for 24 hours. Three parts of the resultant suspension was stirred into 120 parts of a white water-based latex house paint ("Lucite" House Paint Du Pont 50C white) and the tinted paint was coated onto paper and dried. A dark grey, fairly uniform, coating was obtained. Essentially the same results were obtained when [CH$_3$(CH$_2$)$_7$]$_3$N$^+$N$^-$CN is substituted for (CH$_3$)$_3$NN$^-$CN in the above. When 10 grams of lampblack is added to 84 ml. of water and agitated as in the above experiments a thin fluid suspension of carbon black is formed which separates on standing after about 1 hour. A mixture of the suspension of lampblack in water with 120 parts of white paint mixed as described above was coated on paper and dried and gave a much lighter shade of grey and was nonuniform.

The hydrolysis products can be prepared from the compounds of this invention accordingly:

EXAMPLE A

Triethylureidoammonium Chloride $$(C_2H_5)_3N^{\oplus}\text{—}N^{\ominus}\text{—}CN \xrightarrow{H_3O^+} (C_2H_5)_3N^{\oplus}\text{—}NH\text{—}\overset{O}{\underset{\|}{C}}\text{—}NH_2Cl^{\ominus}$$

Triethylamine cyanoimide (4.0 g., 0.28 mole) was dissolved in 16 percent hydrochloric acid (25.8 ml.) and heated at 50°–54 C. for 18 hours. The reaction mixture was evaporated to dryness (0.1μ/50° C.) to give a white crystalline solid (5.50 g.).

| H n.m.r. spectrum: | (D$_2$O solution, tetramethylsilane internal standard). | |
|---|---|---|
| τ | Assignment | Weight |
| 8.62 (triplet) | CH$_3$ | 9 |

| | | |
|---|---|---|
| 6.09 (quadruplet) | —CH₂ | 6 |
| 5.48 (singlet) | H₂O from exchange of NH + NH₂ with D₂O | 3 |

Infrared spectrum: $\lambda_{max}^{Nujol}$ 2.9μ, 3.05μ, 3.1μ (NH); 5.90μ (>C=O).

EXAMPLE B

Trimethylureidoammonium Chloride

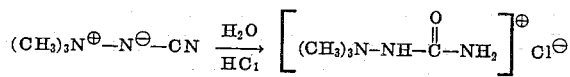

Trimethylamine cyanoimide (4.0 g., 0.04 mole) dissolved in 7 percent hydrochloric acid (35 ml.) was heated at 50°–54° C. for 18 hours. The reaction mixture was evaporated to dryness (50° C./1 mm.) to give a white crystalline solid (6.55 g.) which was dissolved in absolute alcohol. The alcohol solution was filtered and evaporated to dryness (50° C./1 mm.) to give white needles (6.0 g., 98.5 percent). A 1 g. aliquot of this product was recrystallized twice from alcohol and ether to give purified white needles (m.p. 159°–160° C. with gas evolution). A water solution of this compound was slightly acidic.

Anal. Calcd. for C₄H₁₂N₃ClO.

| | | | | |
|---|---|---|---|---|
| C, 31.27; | H, 7.87; | N, 27.36; | Cl, 23.08; | M.W., 153.6 |
| Found: C, 31.54; | H, 7.99; | N, 27.06; | Cl, 24.11; Cl, 23.50 | M.W., |

H n.m.r. spectrum: (deuterium oxide solution, tetramethylsilane internal standard).

| τ | Assignment | Weight |
|---|---|---|
| 6.30 (single peak) | —CH₃ | 3 |
| 5.26 (single peak) | H₂O (from exchange of NH₂ with D₂O) | 1 |

Infrared spectrum: $\lambda_{max}^{KBr}$ 2.97μ, 3.05μ, 3.12μ, 3.20μ (NH and/or NH₂); 3.32μ, 3.43μ (saturated C—H); 5.87μ (C=O); 6.23μ, 6.50μ (NH and/or NH₂).

EXAMPLE C

Ammonium Salt of Pseuoureido Trimethylammonium Chloride

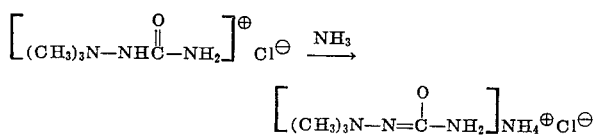

An aliquot (5 g.) of the crude hydrolysis product described in Part B was dissolved in absolute alcohol (100 and excess anhydrous ammonia was added. The white salt which precipitated was separated and recrystallized twice from methanol and ether (m.p. 162.8°–163.2° C.). An aqueous solution of this salt was slightly basic.

Anal. Calcd. for C₄H₁₅N₄ClO:

| | | | |
|---|---|---|---|
| | C, 28.15; | H, 8.86; | N, 32.83; Cl, 20.78 |
| Found: | C, 28.43; | H, 9.04; | N, 33.07; Cl, 20.95 |
| | C, 28.59; | H, 8.98; | |

H n.m.r. spectrum: (deuterium oxide solution, tetramethylsilane internal standard).

| τ | Assignment | Weight |
|---|---|---|
| 6.59 (single peak) | —CH₃ | 3 |
| 5.20 (single peak) | H₂O (from exchangeable protons) | 2 |

Infrared spectrum: $\lambda_{max}^{KBr}$ 2.94μ, 3.01μ, 3.17μ (NH₂, NH or NH₃⁺); 3.38μ (saturated C—H); 5.84μ (possibly C=O); 6.13μ, 6.41μ (NH₂ and/or C=N); 7.13μ (NH₄⁺).

The foregoing detailed description has been given for clarity of understanding only and no unnecessary limitations are to be understood therefrom. The invention is not limited to the exact details shown and described for obvious modifications will be apparent to those skilled in the art.

The embodiments of the invention in which an exclusive property or privilege is claimed are defined as follows:

1. A zwitterionic compound of the formula

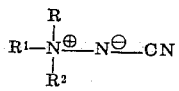

wherein R is alkyl of up to 10 carbon atoms or cycloalkyl of four to six carbon atoms, R¹ and R², taken separately, are alkyl of up to 10 carbon atoms, cycloalkyl of four to six carbon atoms, phenyl or naphthyl; R¹ and R² taken together, is a divalent alkylene group of four to six carbon atoms; and R, R¹ and R² taken together, is —CH=CH—CH=CH—CH=.

2. The compound of claim 1 wherein R, R¹ and R² are ethyl.
3. The compound of claim 1 wherein R, R¹ and R² are methyl.
4. The compound of claim 1 wherein R is cyclohexyl and R¹ and R² are ethyl.
5. The compound of claim 1 wherein R, R¹ and R² are n-octyl.
6. The compound of claim 1 wherein R, R¹ and R² taken together is —CH=CH—CH=CH—CH=.
7. The process for preparing a compound of claim 1 comprising heating in an inert solvent at a temperature of 0°–100° C.

a. a tertiary amine of the formula

wherein R, R¹ and R² are as defined in claim 1, and
b. cyanogen azide.

* * * * *